US007254463B1

(12) United States Patent
Moore

(10) Patent No.: US 7,254,463 B1
(45) Date of Patent: Aug. 7, 2007

(54) FUEL DISPENSING SYSTEM WITH MODULAR COMPONENTS

(76) Inventor: Philip R. Moore, 102 Commerce Cr., Madison, AL (US) 35758

( * ) Notice: Subject to any disclaimer, the term of this patent is extended or adjusted under 35 U.S.C. 154(b) by 463 days.

(21) Appl. No.: 10/773,742

(22) Filed: Feb. 6, 2004

Related U.S. Application Data

(60) Provisional application No. 60/445,790, filed on Feb. 6, 2003.

(51) Int. Cl.
*G06F 17/00* (2006.01)
*B67D 5/06* (2006.01)

(52) U.S. Cl. .......................... 700/241; 222/23; 222/14; 222/2

(58) Field of Classification Search ................ 700/241; 222/2, 14, 23, 27, 28
See application file for complete search history.

(56) References Cited

U.S. PATENT DOCUMENTS 4,576,312 A 3/1986 Swick, Jr.
5,083,846 A * 1/1992 Day et al. ..................... 222/74
5,797,470 A * 8/1998 Bohnert et al. ............... 186/53
6,055,521 A * 4/2000 Ramsey et al. ............. 700/232
6,456,491 B1 * 9/2002 Flannery et al. ............ 361/685
6,640,997 B1 * 11/2003 Anderson ....................... 222/2
7,031,779 B2 * 4/2006 Horn et al. ................. 700/108

* cited by examiner

*Primary Examiner*—Gene O. Crawford
*Assistant Examiner*—Timothy Waggoner
(74) *Attorney, Agent, or Firm*—Mark Clodfelter

(57) ABSTRACT

A fuel dispenser containing electronic/electrical components controlled by a computer is disclosed. The computer and all electronic components, including a touch screen display, are mounted in a module or rack provided with a pair of slides. A recess in the fuel dispenser receives the module on mating slides. At least one connector or plug on the back of the electronics module engages a mating plug mounted in the recess so that when a replacement electronics module is installed, connections to all electronic components is automatically made. As one feature of the invention, configuration data for the fuel dispenser is stored in a flash memory either permanently mounted to the computer or in removable relation therewith. After replacing an electronics module, the configuration data may be uploaded to the permanently mounted flash memory or the flash memory may be removed from the defective module and installed in the operating module. This eliminates the need to manually re-enter configuration data after repair of the fuel dispenser.

20 Claims, 9 Drawing Sheets

FUEL DISPENSING SYSTEM WITH MODULAR COMPONENTS

CROSS REFERENCE TO RELATED APPLICATIONS

This application claims the benefit of provisional application No. 60/445,790, filed Feb. 6, 2003.

FIELD OF THE INVENTION

This application relates primarily to vehicular fuel dispensing systems, and particularly to a fuel dispensing system wherein the electronics portion of the system are incorporated in a self-contained module that requires no particular service skills to replace, and which further includes networking for enabling point-of-sale transactions with credit cards, smart cards or similar card-based systems, and for communicating between discrete fuel dispensers to provide for unattended fuel dispensing by customers.

BACKGROUND OF THE INVENTION

Vehicular fuel dispensing systems generally include at least one underground storage tank that holds a quantity of fuel, with piping that couples the tank to a service island. In general, a fuel-submersible pump in the underground tank provides fuel under pressure to the service island where it is pumped by a customer into a vehicle or container. At the service island, at least one metal cabinet encloses fuel dispensing apparatus including solenoid valves that control fuel flow, and where there are several grades of fuel, allow a selection of a particular grade of fuel for dispensing. Typically, the hydraulic components, including flow meters and associated encoders, flow control valves, pumps and motors and similar fuel handling components are located in a lower portion of the metal cabinet, while the upper portion of the cabinet houses a customer interface, pump controllers, network interface devices and other such electronic components. In more modern systems, a computer is typically installed in the upper portion of the cabinet to control operational functions of the dispenser, these functions including associating a price with a particular grade of fuel, calculating a price for dispensed quantities of fuel and controlling displays of price and quantities of fuel. In addition, where credit cards may be used to "pay at the pump", the computer controls components connectable to the Internet for verifying credit cards of customers, or to an Ethernet link in turn connected to a database for verifying credit cards or the like. In addition, the computer may also control customer communications devices such as receipt printers, card readers, cash note acceptors and storage units, touch screens, keypads, displays upon which fuel pricing and quantity are indicated, as well as advertising or other informational services that may be present.

One problem associated with such modern fuel dispensing stations is that when components fail, they must be serviced by specialized technicians that currently charge about 75 cents/mile travel time and about $75.00/hour for service time. Where fueling stations are in remote locations, it is not uncommon for a proprietor to pay $1000.00 or more just in travel for the service technician. It is also known that, as the computerized and electrical components are located generally in a relatively harsh environment, they are generally most prone to failure and that most service calls are related to electronic or computer components in the fuel dispenser.

An example of such a fuel dispenser is illustrated and described in U.S. Pat. No. 4,576,312 to Swick, Jr. In this patent, it can be seen that the electronics are housed within housing 30, which must be substantially disassembled in order to gain access for maintenance, repair and servicing. An improvement to this design is illustrated and described in U.S. Pat. No. 5,083,846 to Day, Jr. et al. In the Day, Jr. et al patent, it can be seen that the electronics are housed on a unitized door 30 and within the housing defined by walls 42, 44, 46, 48.

There are several problems with the dispenser designs described above, and with fuel dispensers in general. One problem is limited access to the electronics, which often requires disassembly of the cabinet or opening multiple compartments in the fuel dispenser. Further, access to the electronics can differ by model, requiring a large knowledge base and experience to effectively service and maintain different types of fuel dispensers. Other problems have been created by increasing complexity as more customer communication devices and features are added to the fuel dispenser electronics. Existing dispensers often include several electronic modules or circuit boards, and complexity of servicing requires an expensive investment in highly trained installation and service technicians, sophisticated diagnostic equipment and an inventory of replacement parts, including computer circuit boards, pump control circuit boards, networking circuit boards and so forth. As stated, these circuit boards are usually mounted in different locations in the fuel dispenser and connected by cables. Further, dispenser manufacturers often require that installation and service technicians complete factory training, and fuel dispenser operators are often constrained to use "factory-authorized" service technicians. Yet another problem created by the complex electronic configurations is a limited ability to upgrade dispensers in the field. Further yet, after being repaired, configuration data of current fuel dispensers, i.e. information related to the number of fuel hoses and types of fuel, the customer interface, card reader and receipt printer and other such information must be entered via a separate keypad, typically mounted inside the fuel dispenser. Here, after repair of the fuel dispenser, a service technician enters codes representative of the configuration data into one or more computer memories, a process that usually takes at least 30 minutes or so.

Accordingly, Applicants propose constructing a fuel dispensing station wherein the electronic control and computerized components thereof are integrated and housed in a discrete module that simply slides or otherwise is easily mountable into position in the metal cabinet. Electrical connectors on the module and in the recess of the fuel dispenser within which the module is slidably installed are constructed so that when a new or refurbished module is slid into place, the electrical connectors are brought into mating relation and automatically connect the electronics module to the fuel dispenser. As such, all that is required to replace a faulty electronic/electrical module is for an individual, who may have no particular specialized training in servicing the fuel dispenser, to open the fuel cabinet, pull out the defective module containing all the electronic components and mount a functional module to the rails or slides and slide the functional electronic/electrical module into place. In some embodiments, configuration data may be offloaded and stored for later retrieval in instances where the computer is operational, and if the computer is not operational then the configuration data may be uploaded into the replacement computer by a site controller computer containing the configuration data. In other embodiments, the configuration data may be in a removable flash memory card that is simply removed from the defective module and installed in the replacement module. The defective module may then be sent for repair. Spare electronic modules may be kept on site for immediate use, or a functional module may be shipped to a site when needed. Thus, the need for expensive service calls by specialized technicians to repair electronic/electrical components of fuel dispensing stations is eliminated. Such a system is particularly suited for remote locations that may be hundreds of miles from a city or town large enough to obtain or provide support for a fuel dispenser. In this instance, and as stated, an individual may replace a defective electronics module by simply sliding the defective module out of the fuel dispenser and sliding an operating module into place.

Other enhancements of Applicants invention include splitting the computer in accordance with U.S. Pat. No. 6,012,101, entitled SPLIT COMPUTER, which is incorporated in its entirety herein by reference. In this instance, the computer portion is located in a protected environment, such as inside a convenience store or other business establishment, with the remaining peripheral components located inside the fuel dispenser enclosure. The computer and dispenser components may be connected by an Ethernet link that incorporates separate PCI bus time domains at each end, as described in the referenced patent. In other embodiments, the dispenser may be coupled by conventional copper wire or by an optical link to a computer in the protected location.

DETAILED DESCRIPTION OF THE DRAWINGS

Figure 1:
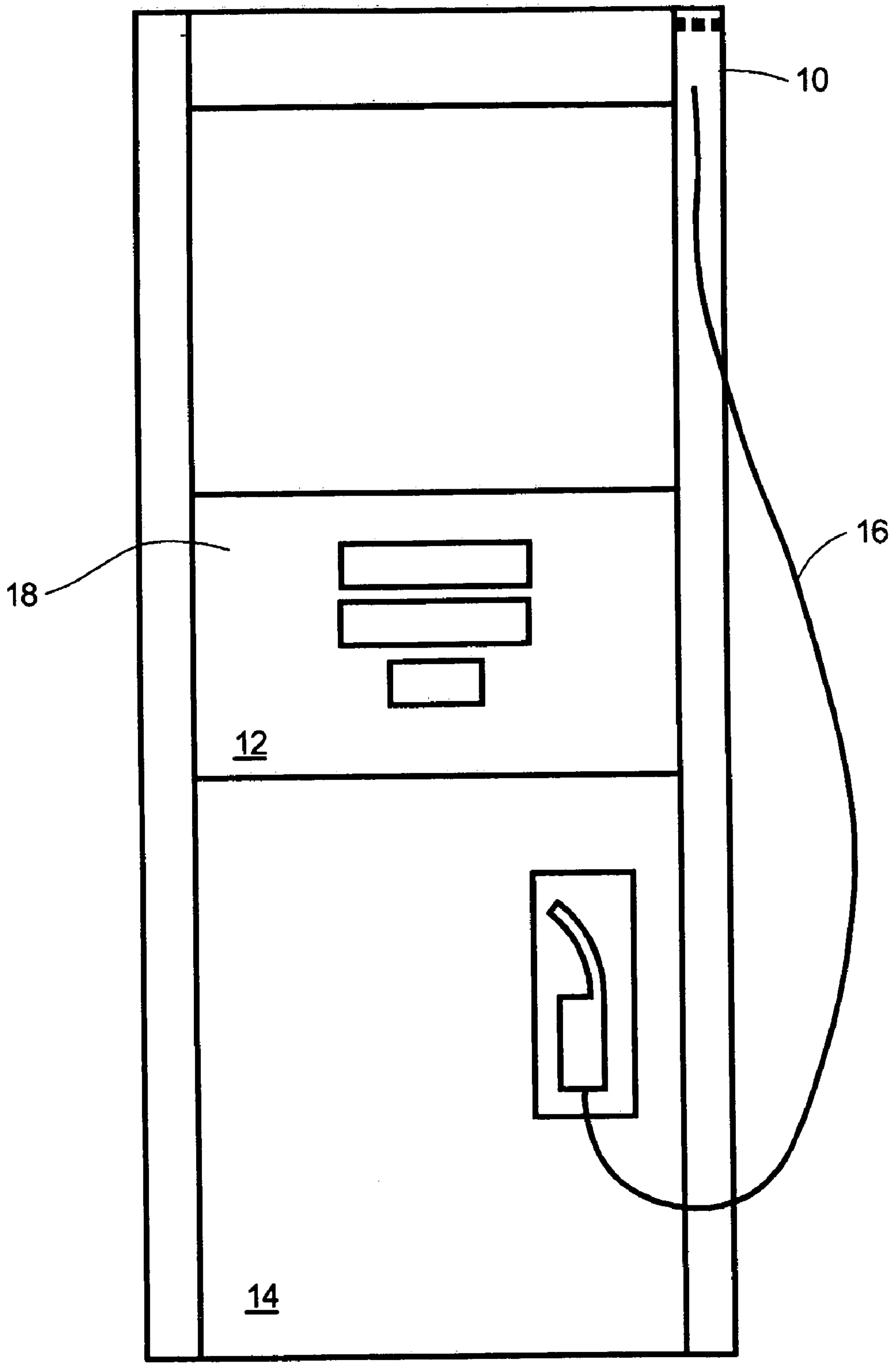
FIG. 1 is a diagrammatic view of a fuel dispenser.

For implementing Applicants invention, reference is initially made to FIG. 1. Here, a fuel dispenser 10 is shown as having an upper electronics region 12 incorporating a fuel flow control system and a lower fuel handling hydraulics region 14, the dispenser 10 being conventionally mounted on a service island or the like (not shown). A fuel grade or type of fuel selected by a customer is routed by the dispenser 10 to an associated hose and nozzle/handle assembly 16. In addition, solenoid valves are provided in the enclosure for mixing or blending fuels and controlling rate of fuel flow as determined by the operator of the pump handle or proprietor of the convenience store or similar dispensing station. These solenoid valves and other fuel flow handling devices are electrically coupled to the electronics module and controlled thereby.

Figure 2:
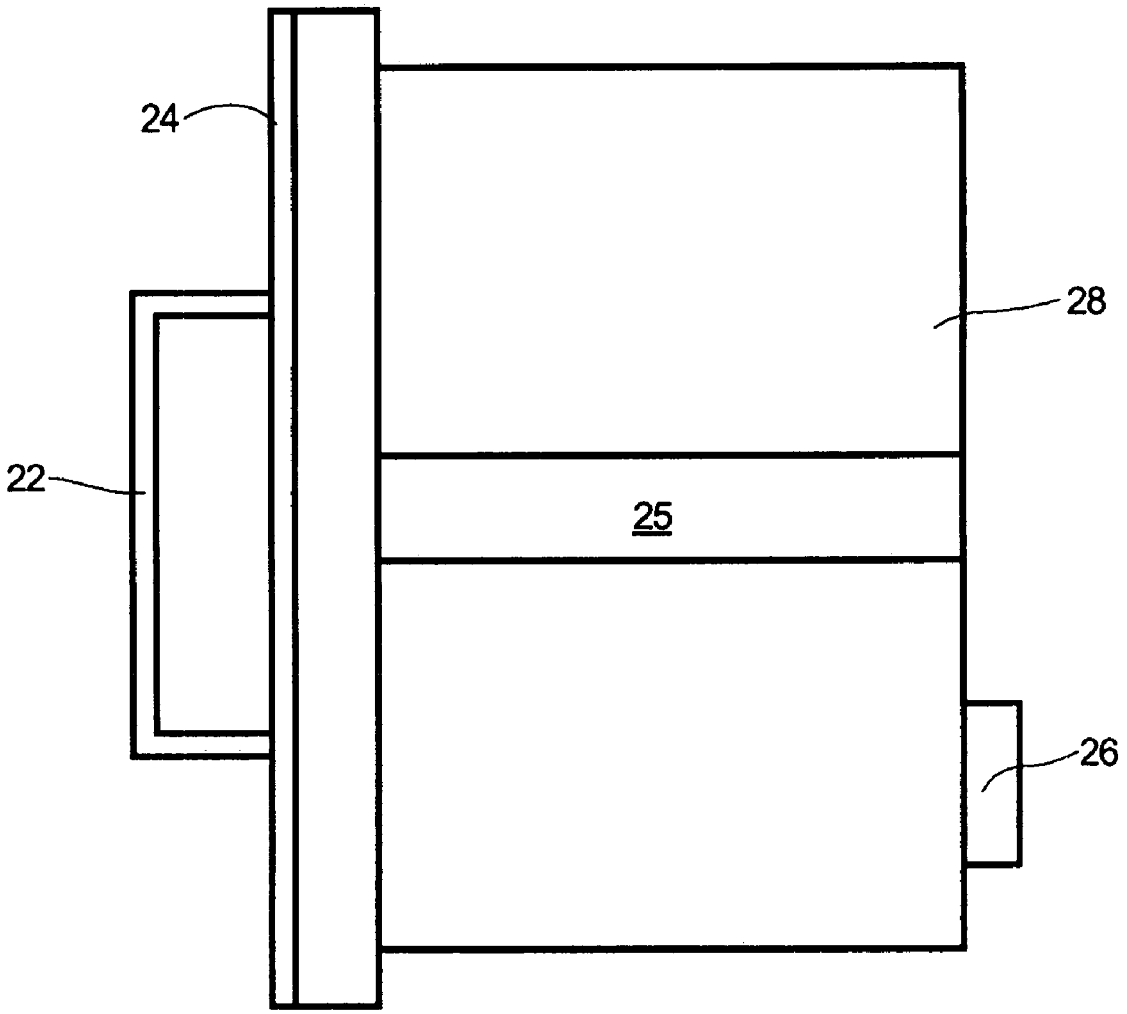
FIG. 2 is a diagrammatic view of an electronics module of the instant invention.

Electronics region 12 may be covered, on a front side facing a customer, by a lockable door having an opening through which a customer may access a touch screen, or other similar panel 18 configured to be conveniently opened to reveal an electronics module 20. As shown in FIG. 2, handles 22 may be provided on either side of a front 24 thereof, with a pair of slides 25 (only 1 shown) mounted longitudinally along module 20. An electrical connector 26 may be mounted on a rearward side 28 of module 20, the connector enclosing a plurality of electrical terminals that carry electrical power potentials and a number of signals to/from module 20. Alternately, handles 22 and connector 26 may be differently oriented so that the module may be pulled out on slides similar to slides 25 from a side or rear of dispenser 10. The module 20 may be completely enclosed, or may simply be a frame or rack generally enclosing the electronics, with slides appropriately mounted on the frame and in a recess of the fuel dispenser so as to enable the module to be relatively precisely positioned within the recess to facilitate electrical connection of the respective connectors when the module is slid into place along the slides. Alternately, the module may be coupled to the fuel dispenser by conventional cabling and associated plugs.

Figure 3:
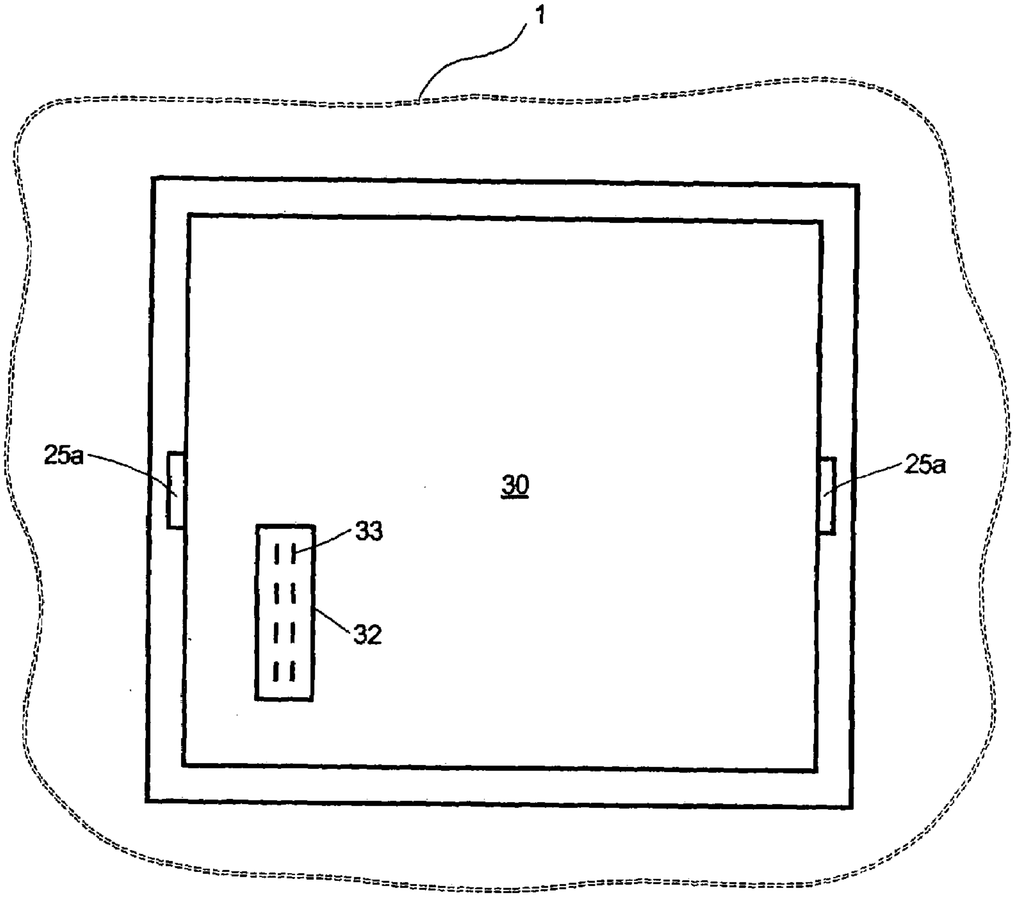
FIG. 3 is a diagrammatic view of a receptacle for the electronics module as shown in FIG. 2.
Figure 3A:
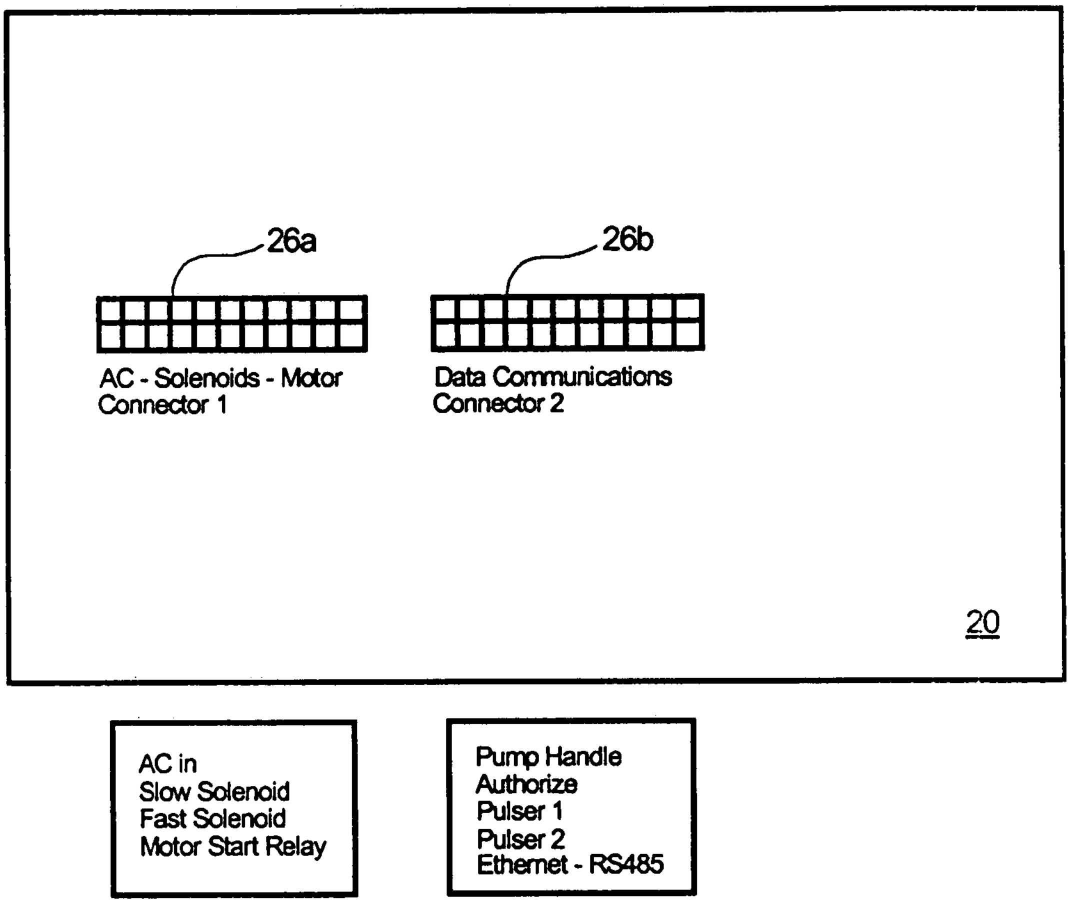
FIG. 3*a* is a diagrammatic view of one embodiment of electrical connectors of an electronics module of the instant invention.

A recess or opening 30 in dispenser 10 for receiving a module 20 is shown, by way of example, in FIG. 3. Here, slots or receiving slides 25*a* in sides of recess 30 receive slides 25 on module 20. Slots 25*a* may be configured similarly to a drawer slide, or similar to a 2-part slide commonly used on sliding keyboard trays mounted underneath desks, or may simply be provided with rollers so that slides 25 simply ride on the rollers. In any case, slides 25 and slots 25*a* are accurately fabricated so that the slides reliably enable the connectors to engage in mating relation. As stated, an electrical connector 32 is provided in a rear of recess 30, and is provided with a plurality of electrical terminals 33 that are configured to mate with the electrical terminals within connector 26 of module 20. At least one of receptacles 26, 32 may be mounted so as to have a slight amount of free vertical and horizontal movement to facilitate a mating engagement between receptacles 26, 32. Here, edges of one or both of the connectors may be beveled so as to allow one of the connectors to move slightly vertically and laterally to enable a smooth connection between the two plugs. Another possible configuration of mating connectors is shown in FIG. 3*a* wherein the module 20 and recess 30 are each provided with two discrete connectors 26*a*, 26*b* (only one set shown on a module 20), with connector 26*a* handling AC power, solenoids and motor control signals and connector 26*b* handling data and communication signals. As should be apparent, connector 26*b* and associated wiring may be shielded as appropriate to prevent interference and EMF radiation. Additionally, where used, an optical port for optical communications may be provided separately or integrated in a one of connectors 26*a*, 26*b*.

Figure 4A:
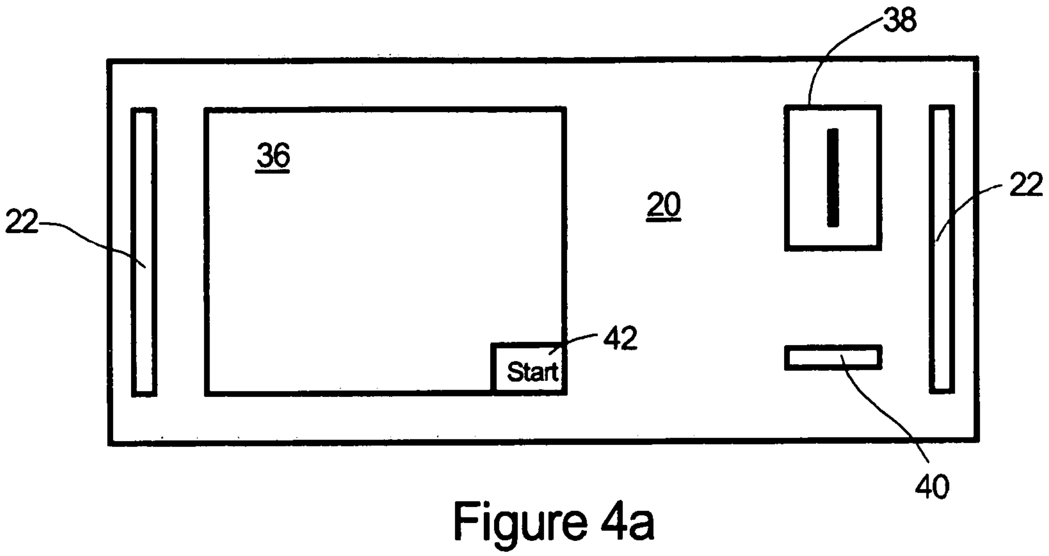
FIGS. 4*a*-4*c* are diagrammatic views of various embodiments of an electrical module of the instant invention.
Figure 4B:
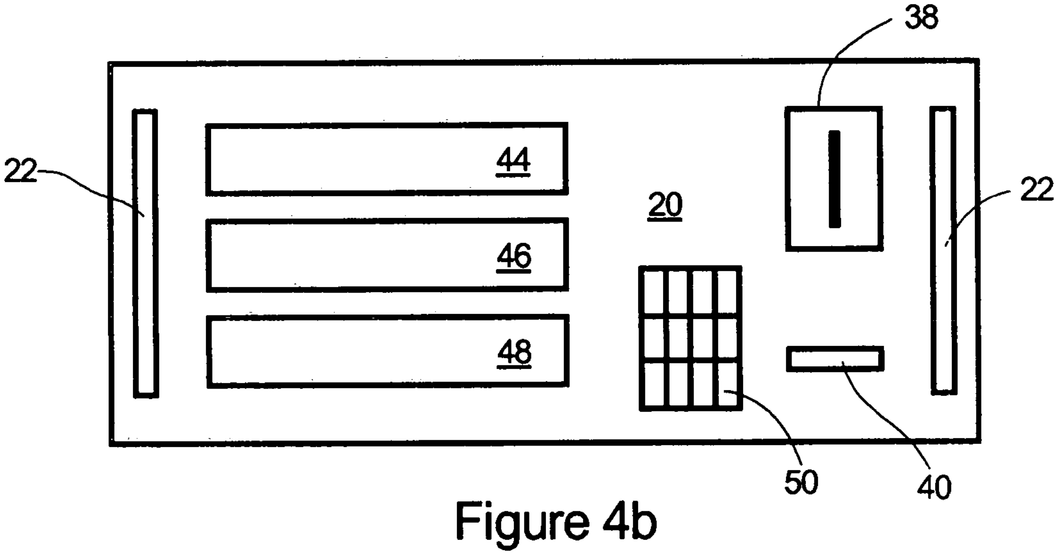
Figure 4C:
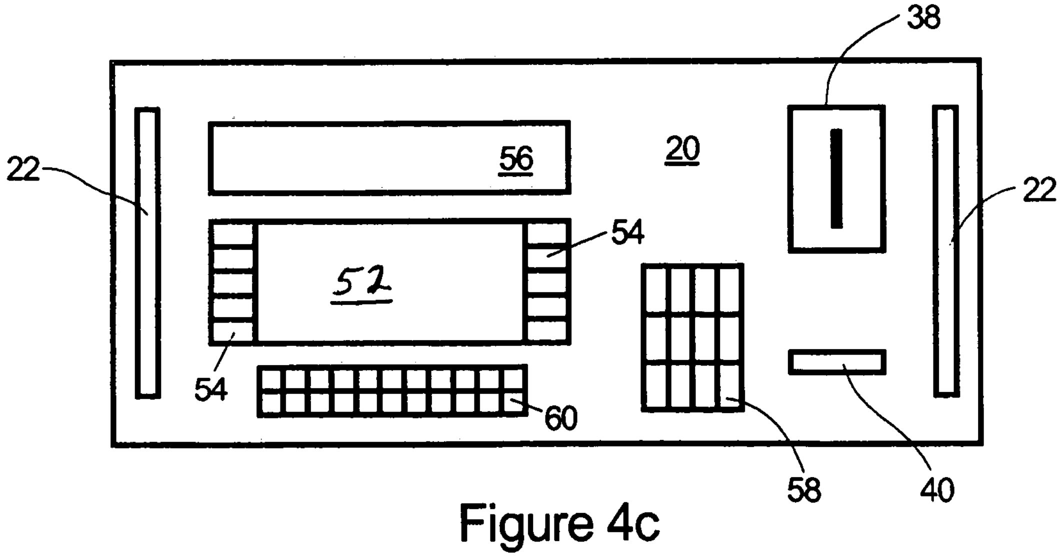

FIGS. 4*a*, 4*b* and 4*c* illustrate three possible configurations of a front portion of a module of the instant invention. In FIG. 4*a*, a large format LCD graphics display 36 is provided, this display in at least some instances being a touch-screen display so that customers may make at least fuel grade selections and payment options by touching icons or other representative indica on the display. Additionally, a keypad representation may be provided on the touch-screen display for customers to provide PIN numbers for credit and debit cards. In addition, other information, such as fuel grades and associated prices, quantity of fuel pumped and total price may be displayed on display 36. A magnetic strip card and/or smart card reader 38 is provided for payment via credit, debit or smart cards, and a printer such as a thermal or other printer 40 provides a sales receipt. When not being used to display fuel pricing information or during use, display 36 may be used to display advertisements, live weather information, road hazard or construction information or any other information deemed necessary or useful. A START icon 42 located in an unobtrusive location may be provided to revert the display back to fuel pricing or a starting point for dispensing fuel.

FIG. 4*b* illustrates another possible configuration wherein a total sale indicator 44, total volume indicator 46 and price indicator 48 are provided, these displays preferably being LCD or similar electronic displays. A card reader 38 and receipt printer 40 are also provided as described. In this embodiment, a keypad 50 is provided to enable a customer to select fuel grades and payment options.

FIG. 4*c* illustrates a third possible configuration wherein a small format graphics display 52 is used to display fuel grade and pricing information, with columns 54 of ATM-type soft keys on either side of display 52 for selection of a particular grade or type of fuel displayed adjacent a respective button. A total sale electronic indicator 56 is provided as described above, along with a card reader 38 and receipt printer 40. A customer keypad 58 is provided for customers to provide PIN numbers. In addition, an alphanumeric keypad 60 may be provided for more extensive transactions, such as fleet transactions where drivers would enter data such as a driver identification code, a vehicle code or other information. Of course, where a touch screen is provided, the alphanumeric keypad may be displayed for use on the touchscreen.

Figure 5:
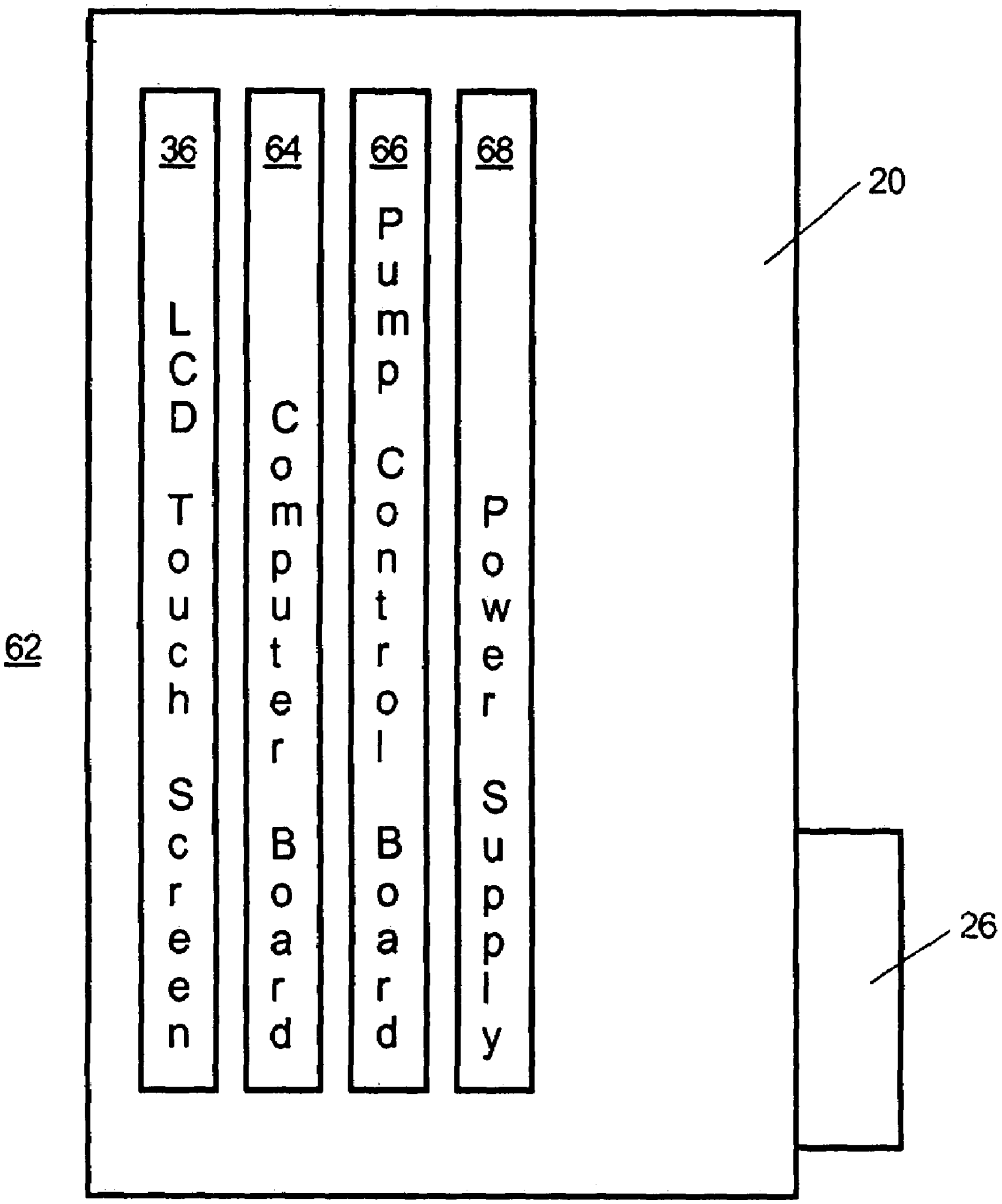
FIG. 5 is a diagrammatic view of one possible layout of various circuit cards of an electronic module of the instant invention.

FIG. 5 is a diagrammatic, cut-away view taken through the touch screen 36 of an electronics module showing, by way of example, one possible layout of the components. As shown, the LCD touch screen 36 is visible from an exterior 62 of module 20. As should be apparent to one skilled in the art, and as electronic displays have operational temperature constraints, a heating plate (not shown) is provided behind the LCD touch screen to heat the touch screen from behind during cold weather operation, and a cooling fan (not shown) operates to cool the touch screen display when temperature within the dispenser enclosure rises toward operational upper limits. Where a different screen is used that does not require heating and cooling, these heating and cooling components may be omitted. Behind the LCD touch screen is mounted a computer motherboard 64, such as a motherboard part number ENDAT-3201M manufactured by UNICORN COMPUTERS of Taiwan. This is a particularly small motherboard utilizing a VIA™ chipset and sufficient memory, such as 32 megabytes, to perform all needed functions of the fuel dispenser and has a wide operational temperature range. Behind the computer 64 is a pump control circuit board 66, this circuit board containing circuitry for energizing selected ones of the fuel dispenser solenoids to provide the particular fuel selected by the customer. As should be apparent, this circuitry is coupled to computer 64 and is controlled thereby. Lastly, a power supply board 68 is provided for powering the computer, LCD touchscreen display and pump control board. These circuit boards are spaced apart and stacked one behind the other, as by mounting with standoffs, with electrical connections therebetween being effected by ribbon cables and other conventional conductors, or by using custom designed circuit boards having modular plugs and corresponding terminals on respective circuit boards that plug into one another. These component circuit boards may be housed in a housing to provide radiation and interference shielding with appropriate heat sinking where appropriate. Additionally, as stated, one or more fans may be provided to cool the electronic assembly formed by these stacked circuit boards.

Figure 6:
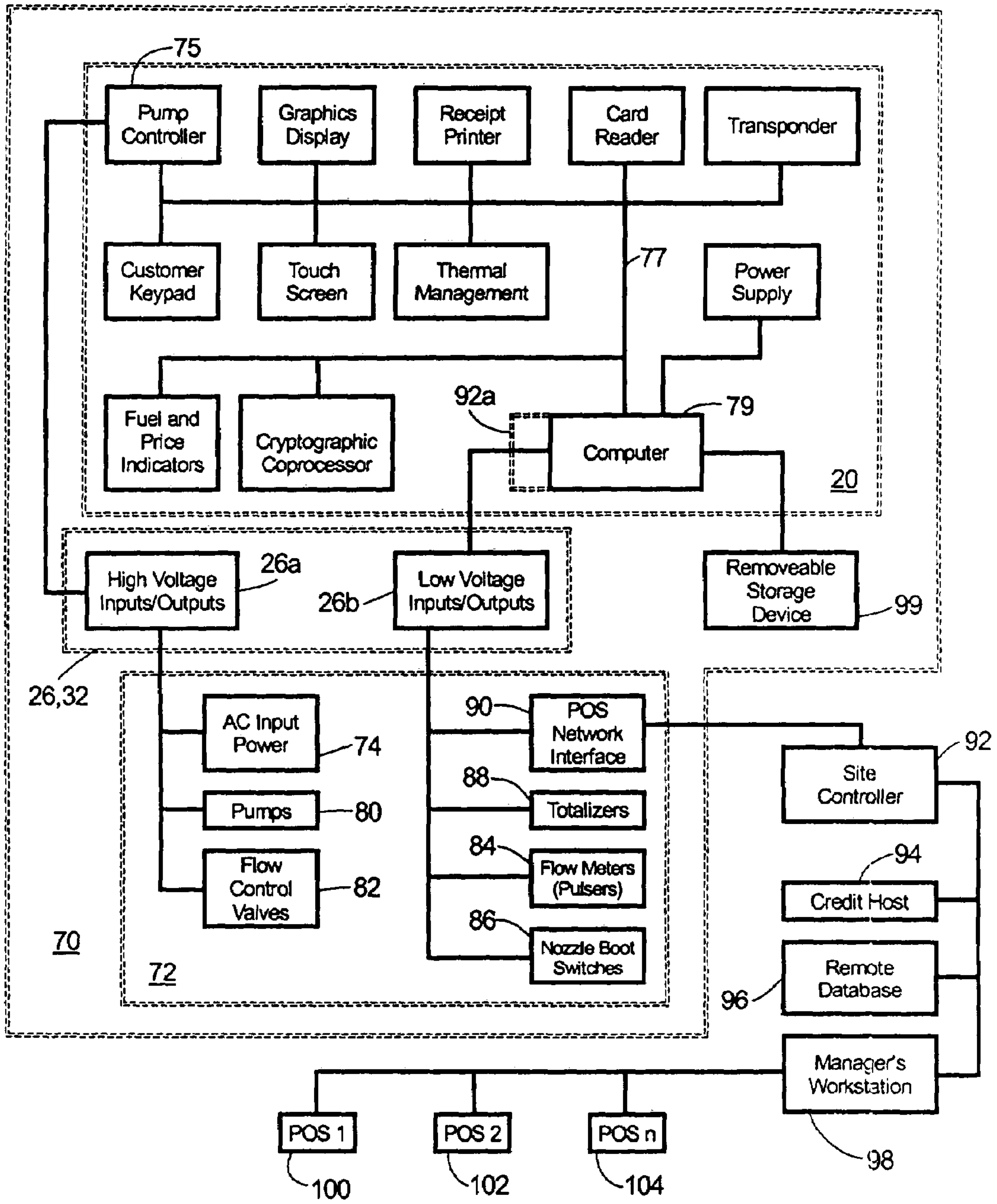
FIG. 6 is a block diagram of components of one embodiment of a fuel dispenser of the instant invention.

FIG. 6 illustrates, in block diagram form, layout of a single fuel dispenser 70 (dashed lines) and its relationship with other point of sale (POS) fuel dispensers. Generally, at 72, the fuel dispenser portion is shown as receiving electrical power at 74, which distributes electrical power to the various components requiring such power. Here, electrical power, such as conventional 110 volts AC or 220 volts AC is provided at least to pump controller 75 via the electrical connectors on module 20 and respective connector in the module recess for selective application to pumps and flow control valves 80, 82. Additionally, this voltage is also provided to energize computer power supply 83, which voltage being suitably rectified and stepped down to develop the required low voltage power, i.e ±12 volts, ±5 volts, 3.3 volts and others depending on computer and LCD requirements for these potentials. Of course, any other component requiring higher voltages, such as the printer, would receive them through the appropriate terminals of the connectors. At 72 are also represented flow meters 84, nozzle boot switches 86 and totalizers 88. These components conventionally operate in accordance with their functions, as should be apparent to one skilled in the art, with their signals provided to their respective terminals at the connectors. Point of sale network interface 90 may be coupled to site controller 92 via cabling, fiber optic cable or wireless transmission for remote control of operation of the fuel dispenser. Site controller 92 is also coupled to a credit card database 94 and possibly to another remote database, as may be used to upgrade software of the fuel dispenser, perform diagnostic tests of the system or to obtain total fuel and sales quantities for a particular sales period, such as a day or week. A manager's or administrator's workstation 98 is provided to administer, among other things, functions of the fuel dispenser and handle sales at other point of sale locations 100-104.

With respect to module 20 (FIG. 6), it is seen that module 20 is coupled via high voltage connectors 26*a* and low voltage connectors 26*b* routed through or interfaced by receptacle interfaces 26 or 32 as described above. Computer 79 is coupled via a bus or cables 77 so as to provide control signals to the components of module 20. In some embodiments, a removable non-volatile memory storage device 99, such as a flash memory card, may be mounted to module 20 or to the computer motherboard, and which may contain configuration data for the fuel dispenser components, i.e. the type of touchscreen in the module, the types and number of keypads, and other information related to specific configuration of the module 20, as for example one of the configurations as shown in FIGS. 4*a*, 4*b* and 4*c*. In other embodiments, configuration data may be loaded into a permanently mounted flash or other type non-volatile memory on the motherboard, and in yet other embodiments site controller software may be included in a removable or non-removable memory 99. In these embodiments, the configuration data and site controller software is downloaded after a repair or initial installation. With these configurations, the modules may be generically constructed, with the site controller software and configuration data installed at the point-of-sale after the fuel dispenser becomes operational either upon initial installation or after a repair. Thus, where the flash memory is removable, and in the event a fuel dispenser containing the site controller software in a removable memory fails and becomes disabled, the removable flash memory containing site controller software may be removed from the failed dispenser and placed in another fuel dispenser at the site, which then becomes the site controller. As such, customer operations may almost immediately be restored by simply removing the site controller flash memory module from the failed dispenser and installing it in another fuel dispenser at the site. In yet other embodiments, the removable, non-volatile memory storage device may be mounted in the fuel dispenser in a location other than the module, such as in the recess that receives the module or in a protected location inside the fuel dispenser adjacent the module.

Figure 7:
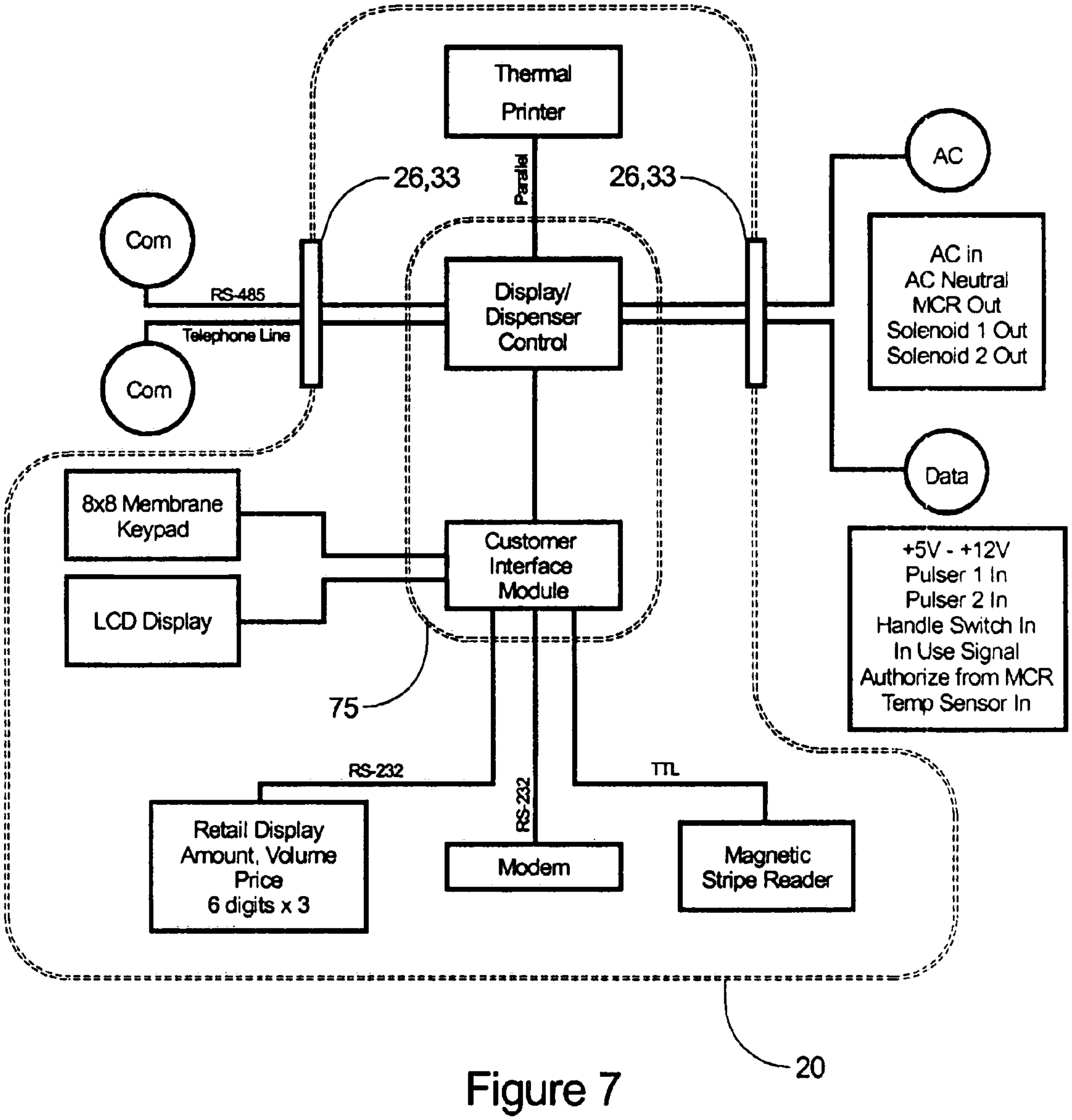
FIG. 7 is a block diagram of one embodiment of an electrical module of the instant invention.

FIG. 7 is a block diagram illustrating a particular embodiment of a module 20 of the instant invention. Here, computer 79, incorporating the functions of a display/dispenser control module and a customer interface module, is shown coupled to an 8×8 membrane keypad, an LCD display, a retail display, a modem, magnetic stripe reader and a thermal printer. Data, AC and communications are shown routed through connectors 26, 26*a*, 26*b* or 32 of module 20.

Figure 8:
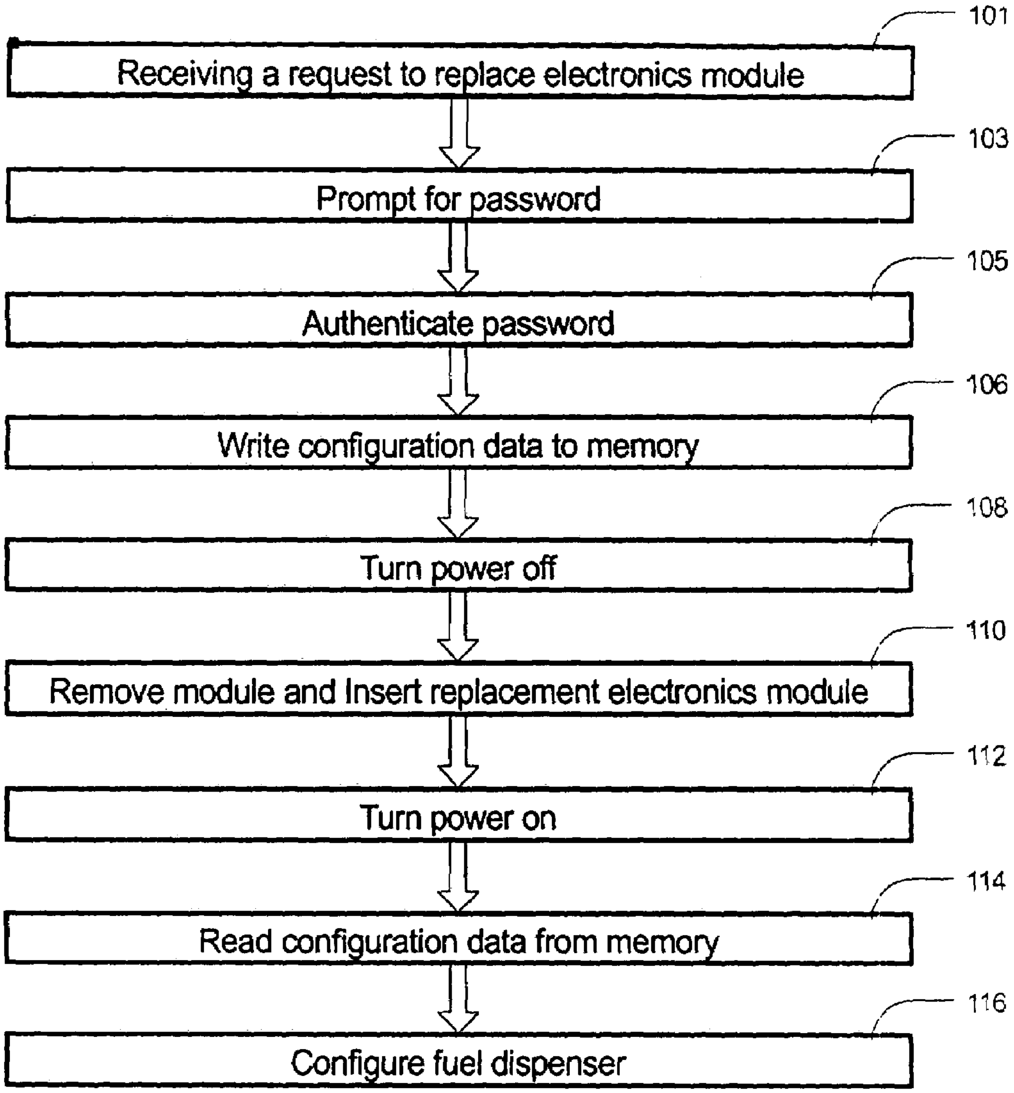
FIG. 8 is a flowchart outlining steps to replace an electronics module of the present invention.

FIG. 8 shows, by way of example, a series of steps undertaken to replace a module 20 in a fuel dispenser. Here, at box 101, a request to replace the electronics module is made. Here, if the computer is still operative, then an individual replacing the module 20 puts the fuel dispenser computer in a maintenance mode, as by pressing simultaneously a pair of virtual buttons that are invisible to the public but the location of which are known to the individual, or by pressing a sequence of buttons that elicit a password or pin number at box 103, which is authenticated at box 105. In this maintenance mode, the computer is taken off-line and shut down, also shutting down the fuel dispenser, so that the module can be replaced. Prior to shutting down, and where the flash memory is permanently installed, configuration data for that fuel dispenser may be fed back to the site controller for later retrieval after the module is replaced, or the configuration data may be permanently stored at the site controller for retrieval by the fuel dispenser. In other embodiments, the configuration data may be incorporated in a removable flash card, which may be password protected to prevent tampering, or installed with a seal issued by an appropriate authority. At box 106 the configuration data, and any other data necessary for fuel dispenser operation, may be stored in a remote memory, such as the site controller memory, and at box 108 power is removed from module 20. At box 110 the defective module 20 is removed from recess 30 (FIG. 3), and a replacement module 20 is inserted into recess 30. Electrical connections are automatically made at the connectors on the module and in the recess as the replacement module 20 is pushed into place. Power is applied to the replacement module 20 at box 112, and at box 114 the configuration data and any other data is retrieved from a remote memory in the site controller, or the removable flash card from the defective module installed in the operating module. Alternately, the removable flash memory card may be obtained from a separate source, such as a weights and measures authority or from a factory source. At box 116 the replacement module is configured in accordance with the configuration and other data.

In another embodiment of the invention, one or more fuel dispensers as shown in FIG. 6 may be provided with an integral site controller 92*a*, which may be embodied as software or firmware in a one of computers 75, in order to allow the pump or pumps to operate autonomously without a human attendant. Currently, autonomous pumps are used in some locations, but these pumps have site controllers installed in outbuildings or possibly in a convenience store or similar establishment that closes at a certain time. By installing or incorporating a site controller in a computer mounted in a module of a fuel dispenser as described, fueling stations may be provided in remote locations, such as in deserts, without the need for any building whatsoever. In this instance, the fuel dispenser containing the computer with the site controller software may be coupled to the other fuel dispensers by a local area network, with routers or software or firmware router-like components controlling flow of data. Here, each fuel dispenser would function in a similar manner as a peer-to-peer network, with the site controller connecting to the Internet as needed to perform credit card verifications from any of the dispensers, transmit data with respect to total sales from all the dispensers, quantity of remaining fuel at the location and diagnostic information regarding "health" of the fuel dispensers and the computer network system. In the instance where a computer containing site controller software or firmware fails, a redundant site controller in another computer 79 may be provided to "pick up" the site control functions, or a more limited control may be effected by assigning a one of the computers in the fuel dispensers to take over the role of the site controller until repairs can be made. Alternately, the computers in each of modules 20 of such an autonomous system may be of sufficient capacity so that any of them may act as a site controller, with networking and arbitration software allowing any of them to connect to the Internet as needed. Here, a device as simple as a wireless gateway-type device incorporated in one or more of modules 20 may allow any of the fuel dispensers to connect simultaneously to the Internet over a single telephone line for required functions.

Having thus described my invention and the manner of its use, it should be apparent to those skilled in the art that incidental changes may be made thereto that fairly fall within the scope of the following appended claims, wherein I claim:

1. A fuel dispenser comprising:

a fuel dispensing cabinet configured for dispensing fuel, and including a fuel dispensing hose, a fuel flow system in said cabinet and connected to a source of said fuel for controllably dispensing said fuel via said dispensing hose, a fuel flow control system further comprising:

a computer display, a computer operatively coupled to said display, electrical pump control circuitry operatively coupled to said computer, power supply circuitry configured to provide power potentials to all components requiring said power potentials and, a removable module in said fuel dispenser cabinet, with said computer display being in usable relation for a customer, and said computer, said electrical pump control circuitry, and said power supply circuitry mounted in said module, said module electrically coupled to said fuel flow system when inserted into place and electrically disconnected from said fuel flow system when removed, so that a replacement said module containing a replacement computer display, a replacement computer, replacement electrical pump control circuitry and a replacement power supply may be easily substituted for a said removable module in said fuel dispensing cabinet wherein at least one of said computer display, said computer, said electrical pump control circuitry, and said power supply circuitry is defective.

2. A fuel dispenser as set forth in claim 1 further comprising slide apparatus upon which said module is slidably mounted to said fuel dispenser.

3. A fuel dispenser as set forth in claim 2 further comprising at least one first electrical connector on said module and coupled at least to said fuel flow control system and at least a second electrical connector mounted in said fuel dispenser and coupled at least to said fuel flow system, said first electrical connector and said second electrical connector being in aligned, mating relation when said module is installed in said fuel dispenser.

4. A fuel dispenser as set forth in claim 3 wherein said first electrical connector is on a rear of said module and said second electrical connector is in a recess within which said module is slidably mounted.

5. A fuel dispenser as set forth in claim 4 further comprising:

a plurality of said fuel dispensers at a fuel dispensing station, a communications network coupling each said computer in each said fuel dispenser together and to a site controller via each respective said first connector and each respective said second connector.

6. A fuel dispenser as set forth in claim 5 wherein said site controller is located in a one of said computers of a respective said fuel dispenser so that said plurality of fuel dispensers are controlled by said site controller and are autonomously operable without need of an attendant.

7. A fuel dispenser as set forth in claim 5 wherein configuration information for each of said plurality of fuel dispensers is stored in one said computer of a respective said fuel dispenser, and transmitted over said communications network to a said computer in a said fuel dispenser requiring said configuration information.

8. A fuel dispenser as set forth in claim 7 wherein said configuration information is stored in a removable flash memory storage device.

9. A fuel dispenser as set forth in claim 7 wherein said configuration information is stored in a permanently installed flash memory device.

10. A fuel dispenser comprising:

a fuel dispensing cabinet configured for dispensing fuel, and including a fuel dispensing hose, a fuel flow system in said cabinet and connected to a source of said fuel for controllably dispensing said fuel via said dispensing hose, a fuel flow control system further comprising:

a computer display, a computer operatively coupled to said display, electrical pump control circuitry operatively coupled to said computer, a card reader operatively coupled to said computer, a receipt-producing device operatively coupled to said computer, power supply circuitry configured to provide power potentials to all components requiring said power potentials and, a module having one side configured for use by a customer, with said computer display, said card reader and said receipt-producing device being in usable relation with said one side, and said computer, said electrical pump control circuitry, said card reader, said receipt-producing device and said power supply circuitry mounted in said module, a recess in said fuel dispenser for slidably receiving said module, at least one first electrical connector mounted to a rear side of said module, said first electrical connector containing a plurality of first electrical terminals, at least one second electrical connector mounted in said recess in aligned relation with said first electrical connector, said second electrical connector containing a plurality of second electrical terminals configured for mating relation with said plurality of first electrical connectors, whereby said module is electrically coupled to said fuel flow system when installed in said recess.

11. A fuel dispenser as set forth in claim 10 further comprising a plurality of said fuel dispensers in a single location, with a communications network coupling said plurality of said fuel dispensers via selected ones of said first electrical terminals and corresponding ones of said second electrical terminals to a site controller configured for coupling sales transactions from said plurality of said fuel dispensers to the Internet for completing said sales transactions.

12. A fuel dispenser as set forth in claim 11 further comprising locating said site controller in a one of said fuel dispensers for autonomous operation of said plurality of fuel dispensers.

13. A fuel dispenser as set forth in claim 12 further comprising a non-volatile flash memory storage device coupled to a said computer in a respective said fuel dispenser and containing at least configuration data for said module of said respective said fuel dispenser.

14. A fuel dispenser as set forth in claim 13 wherein said non-volatile flash memory storage device is a removable nonvolatile flash memory storage device.

15. A fuel dispenser as set forth in claim 13 wherein said non-volatile flash memory storage device is permanently mounted to said computer.

16. A fuel dispenser as set forth in claim 13 wherein said non-volatile flash memory storage device also contains a site controller.

17. A service station including a plurality of fuel dispensers each comprising:

a fuel dispensing cabinet configured for dispensing fuel, and including a fuel dispensing hose, a fuel flow system in said cabinet and connected to a source of said fuel for controllably dispensing said fuel via said dispensing hose, a fuel flow control system further comprising:

a computer display, a computer operatively coupled to said display, electrical pump control circuitry operatively coupled to said computer, power supply circuitry configured to provide power potentials to all components requiring said power potentials, said computer, said electrical pump control circuitry and said power supply circuitry mounted in stacked relation behind and to said display, a card reader operatively coupled to said computer, a receipt-producing device operatively coupled to said computer, a module having a front side configured as a front of said cabinet, with said computer display, said card reader and said receipt-producing device being in customer-usable relation with said front side, said module electrically coupled to said cabinet when inserted into place and electrically disconnected when removed, a non-volatile flash memory coupled to said computer, with configuration data for an associated said fuel dispenser and in said non-volatile flash memory available so that said configuration data may be removed from a defective said computer and re-installed into a replacement computer by disconnecting said flash memory from said defective computer and connecting said flash memory to said replacement computer.

18. A service station as set forth in claim 17 further comprising site controller software in said non-volatile flash memory.

19. A service station as set forth in claim 18 wherein said non-volatile flash memory is a removable flash memory card.

20. A service station as set forth in claim 18 wherein said non-volatile flash memory is permanently installed.

* * * * *